I. H. GOLDMAN.
PISTON ROD PACKING.
APPLICATION FILED MAR. 30, 1915. RENEWED NOV. 15, 1918.
1,303,883.
Patented May 20, 1919.
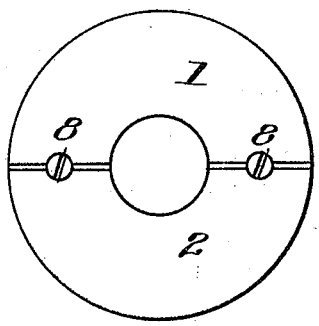
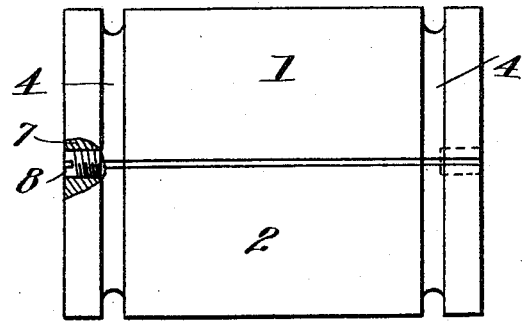
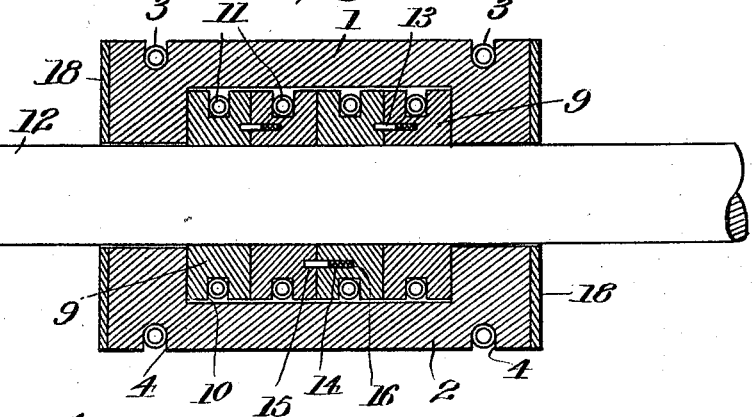
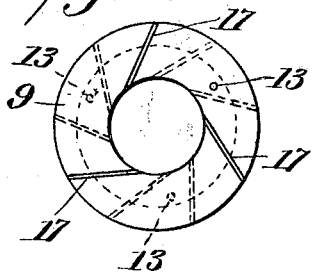
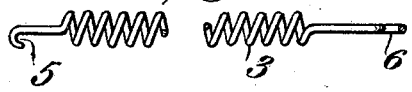
Inventor
Isidore H. Goldman,
By Frederick V. Winters
Attorney

UNITED STATES PATENT OFFICE.

ISIDORE H. GOLDMAN, OF NEW YORK, N. Y.

PISTON-ROD PACKING.

1,303,883.  Specification of Letters Patent.  Patented May 20, 1919.

Application filed March 30, 1915, Serial No. 18,086.  Renewed November 15, 1918.  Serial No. 262,729.

*To all whom it may concern:*

Be it known that I, ISIDORE H. GOLDMAN, a citizen of the United States, residing at New York, in the county and State of New York, have invented certain new and useful Improvements in Piston-Rod Packings, of which the following is a full, clear, and exact specification.

This invention relates to packing for piston rods such as are used in steam engines and it has for its object to provide improved means for holding the sections of each packing ring in such relation to the sections of the other packing rings as to insure the joints in the several rings being always out of alinement. Other objects appear as the description proceeds.

The invention will be first hereinafter described in connection with the accompanying drawings, which constitute a part of this specification, and then more specifically defined in the claim at the end of the description.

In the accompanying drawings, wherein similar reference characters are used to designate corresponding parts throughout the several views:

Figure 1 is an end view of the cage for the packing rings.

Fig. 2 is a side view thereof, a part being broken away to show the screw for holding the sections of the cage in proper alinement.

Fig. 3 is a longitudinal central section through the cage and packing rings therein, the whole device being mounted upon a piston rod.

Fig. 4 is a detailed plan view of one of the sectional packing rings, and

Fig. 5 is a detailed view of the end portions of one of the coiled springs used for holding the sections of the cage together.

The cage is cylindrical in form and divided longitudinally into parts or sections, the number of sections in the present instance being two, designated 1 and 2. When in use, these sections are held together by coiled springs 3 seated in grooves 4 in the sections, said springs being provided with hooks 5 and loops or eyes 6 at their opposite ends to interlock with one another for detachably fastening them in position. To insure against one section of the cage moving or shifting axially with respect to the other, I bore sockets 7 in the meeting faces of the cage sections at each end, and tap said sockets to receive screws 8 which, by engaging the screw threads in sockets, half of which screw threads are in each of the cage sections, will effectively prevent axial movement of either section relative to the other when said sections are held together by the coiled springs 3 in the grooves 4. As illustrated, one of the grooves 4 is preferably arranged near each end of the cage.

Within the cage there are arranged a plurality of packing rings 9, each made in sections, the number of sections in the present instance being three, as shown in Fig. 4. The packing rings have peripheral grooves 10 in which springs 11, similar to those used for holding the sections of the cage together, are placed for pressing the sections of said packing rings around the piston rod 12. To insure the necessary breaking of the joints in the several packing rings, I employ spring pressed pins 13 which are seated in grooves or sockets 14 in certain of the packing rings and project into sockets 15 in adjacent packing rings. Springs 16 are arranged in the sockets 14 and serve to hold the pins 13 in projected position so as to engage the sockets 15 as well as the sockets 14, thus forming a lock between each pair of adjacent packing rings which prevents them from turning relative to one another. At the same time, the pins 13 may be depressed entirely into the sockets 14, when not in use or when the packing rings are being assembled around the piston rod and arranged in proper position.

The sections of the packing rings are spaced apart, as at 17 in Fig. 4 to permit them to close in around the piston rod for taking up wear. On each end of the cage a one-piece metal gasket or washer 18 is preferably arranged to cover the joints between the sections of the cage.

Having thus described my invention, what

I claim as new and desire to secure by Letters Patent of the United States is:

The combination with one sectional packing-ring having sockets in its face, of a spring pressed pin fitted in each socket, and another sectional packing-ring having corresponding sockets to receive parts of said pins, the other parts of the pins being arranged at the same time in the sockets in the first packing-ring, for retaining the packing-rings in position to break joints.

In testimony whereof I have signed my name to this specification.

ISIDORE H. GOLDMAN.